UNITED STATES PATENT OFFICE.

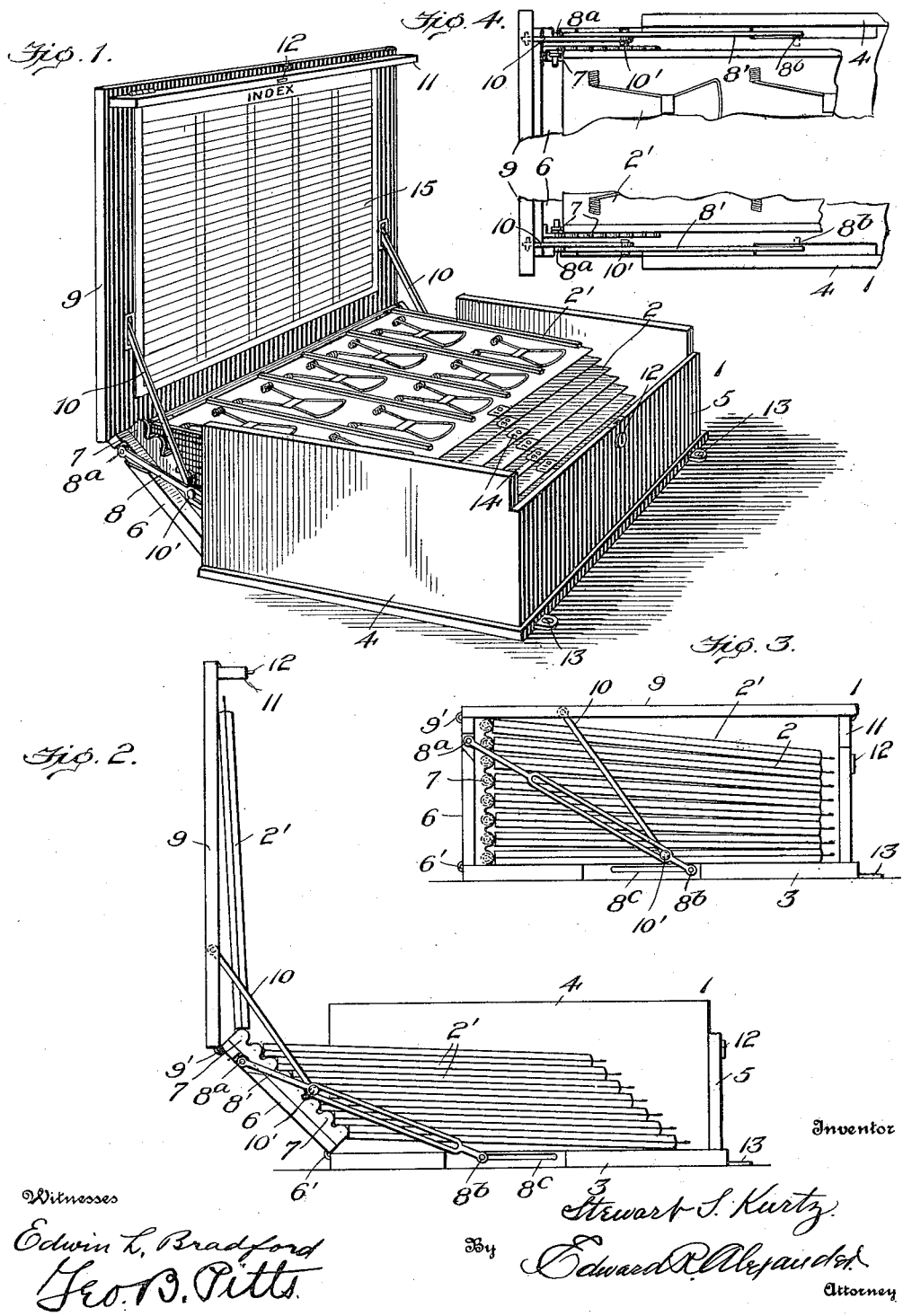

STEWART S. KURTZ, OF CANTON, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,142,971.  Specification of Letters Patent.  Patented June 15, 1915.

Application filed June 9, 1909. Serial No. 501,123.

*To all whom it may concern:*

Be it known that I, STEWART S. KURTZ, a citizen of the United States, residing at Canton, in the county of Stark and State of Ohio, have invented certain new and useful Improvements in Filing Appliances, of which the following is a specification, reference being had therein to the accompanying drawings.

This invention relates to a filing device, and particularly to a credit accounting appliance, adapted for the systematic filing and keeping of credit sales slips.

One of the objects of the invention is to produce a casing or housing of simple construction adapted to support and inclose the leaves of a credit accounting appliance in compact arrangement, when closed upon the leaves, and to support the leaves vertically or horizontally in echelon when in normal operative position.

Another object of the invention is to produce a casing or housing for an accounting appliance, having a hinged top and a hinged side to which a series of record or bill holding leaves are pivoted, and adapted to support the leaves in compact arrangement when the casing is closed, and to be inclined upwardly and rearwardly and support the leaves in echelon when the latter are in normal operative position.

Other objects of the invention will be apparent from the following description and claims, reference also being had to the accompanying drawings, wherein—

Figure 1 is a perspective view of a credit accounting appliance, embodying my invention, the top of the casing being open. Fig. 2 is a side elevation of the appliance, one of the leaves being shown in vertical position and one side of the casing being removed to facilitate the illustration of the appliance. Fig. 3 is a view similar to Fig. 2, showing the casing closed. Fig. 4 is a fragmentary top plan view of Fig. 1.

In the drawings, 1 indicates a casing or housing adapted to receive and support a series of record or bill holding leaves 2.

The casing 1 may be constructed of any suitable material. It preferably comprises a bottom 3, adapted to lie upon a counter or other plane surface, longitudinal side pieces 4, and a front 5.

6 indicates a rear side piece or back provided with hinge devices 6′ which swingably connect it to the rear edge of the bottom 3.

7 indicate pivoting means for swingably mounting the leaves 2, separately or in a group, upon the back 6. When the back 6 lies in a vertical position, as shown in Fig. 3, it will be seen that the leaves 2 lie in compact arrangement with all their free edges in the same vertical plane. But when the back 6 is inclined from the vertical or swung rearwardly, as shown in Figs. 1 and 2 it will be seen that the free edges of the leaves 2 are arranged in stepped relation relatively to each other and each leaf is free to be swung from a horizontal to a vertical position. When swung into the vertical position the free edges of the leaves will be arranged in echelon, or stepped relation relatively to each other.

8 indicates means, preferably comprising two rods 8′, 8′, one at either side of the casing 1, for limiting the swinging movement of the back 6. Each rod 8′ is pivoted at 8ª to the back 6 and slidably pivoted by means of a pin 8ᵇ engaging the walls of a slot 8ᶜ formed in the bottom 3, to the casing 1. When the back 6 is inclined, each pin 8ᵇ engages the end wall of the adjacent slot 8ᶜ and supports the back 6 in its proper inclined position. Suitable means may be provided for locking the rods 8′ in either or both positions of the back 6.

9 indicates a combined top or cover and leaf support for the casing.

9′ indicate hinge devices for swingably connecting the cover 9 to the upper edge of the back 6.

10, 10, indicate a pair of links arranged upon the opposite sides of the casing, each being pivoted at one end to the combined cover and support 9, and at its opposite end slidably pivoted, preferably to the rods 8′ by means of a pivot pin 10′ carried by the link and a slot formed in the adjacent rod 8′. When the cover is opened to a vertical position, as shown in Fig. 2, it operates as a support or backing for the leaves 2, it being held in such vertical position by the links 10. When the cover is closed, the links 10 and rods 8′ slide relatively to each other to permit the compacting of the leaves and the closing of the casing. Suitable means may be provided for locking the cover 9 in its elevated or vertical position.

11 indicates a lip or flange carried by the front or forward edge of the cover 9. The flange 11 is preferably hingedly connected to the cover 11 so that it may be swung upwardly and facilitate the operation of the leaves 2 when the cover 9 is in its vertical position.

12 indicates locking means carried by the lip or flange 11 and front 5 of the casing, whereby the cover may be locked closed and prevent the inspection of or meddling with the leaves and account slips by unauthorized persons.

On account of the weight of the leaves 2 when in their vertical position, I preferably provide devices 13 for securing the casing 1 to the counter or other support to prevent the tilting of the casing upward and backward.

14, 14, indicate index devices carried by one or both faces of each of the leaves 2. The indexes 14 are preferably arranged near the free ends of the leaves 2 so that when they are in vertical or horizontal position with the said ends in stepped relation, the indexes 14 will be visible and facilitate the operation of the leaves.

15 indicates a key or index sheet preferably removably secured to the inner face of the cover 9. This key 15 may be secured to either the back or front face of the uppermost leaf 2′ of the series.

The pivoting means 7 may be removably mounted in the casing, if desired, in order that the leaves may be removed for storing in a vault.

Many alterations in construction and widely differing embodiments and applications of my invention will suggest themselves to those who become skilled or are now skilled in the art of making credit accounting appliances of the class described, without departing from the spirit and scope thereof. My disclosures and description herein, are purely illustrative and are not intended to be in any sense limiting.

What I claim is—

1. In an accounting appliance the combination of a casing having a swinging back, a series of bill-holding leaves pivotally mounted on said back, a combined cover and support hinged to said back, means for supporting the back in an inclined position, and means coöperating with the back-supporting means for supporting the cover.

2. In an accounting appliance, the combination of a casing, a back swingably connected to the casing, a series of leaves pivotally mounted on the hinged back, means for supporting the back in an inclined position, a cover hingedly connected to the back, and connecting means between the cover and the back supporting means for positioning the said cover.

3. In an accounting appliance, the combination of a casing, a back swingably connected to the casing, a series of leaves pivotally mounted on the hinged back, means for supporting the back in an inclined position, a cover hingedly connected to the back, and connecting means comprising a link pivoted to the cover and slidably pivoted to the back supporting means for holding the cover in elevated position.

4. In an accounting appliance the combination of a casing including a bottom, a back swingably connected with the bottom, a series of bill-holding leaves pivotally mounted on said back, a cover hinged to the back and adapted to support the leaves when in upright position, and coöperating means for supporting said back and cover in inclined and upright position respectively.

5. In a filing appliance, the combination of a base, a back hinged to said base, a series of bill-holding leaves pivotally connected to said back, a cover pivoted to said back, a rod having pivotal connection at one end and a pivotal slidable connection at its opposite end with said base and back for supporting the latter in an inclined position, and a separate rod pivotally connected at one end and slidably and pivotally connected at its opposite end to said cover and first mentioned rod for supporting the cover in upright position.

In testimony whereof I affix my signature, in the presence of two witnesses.

STEWART S. KURTZ.

Witnesses:
LAURA E. FIALA,
LAURENCE C. KEELER.

Copies of this patent may be obtained for five cents each, by addressing the "Commissioner of Patents, Washington, D. C."